March 20, 1956 H. J. BRITT 2,739,180
MESSAGE ADDRESS INTERCOMMUNICATING TELEGRAPH SYSTEM
Filed Oct. 21, 1952
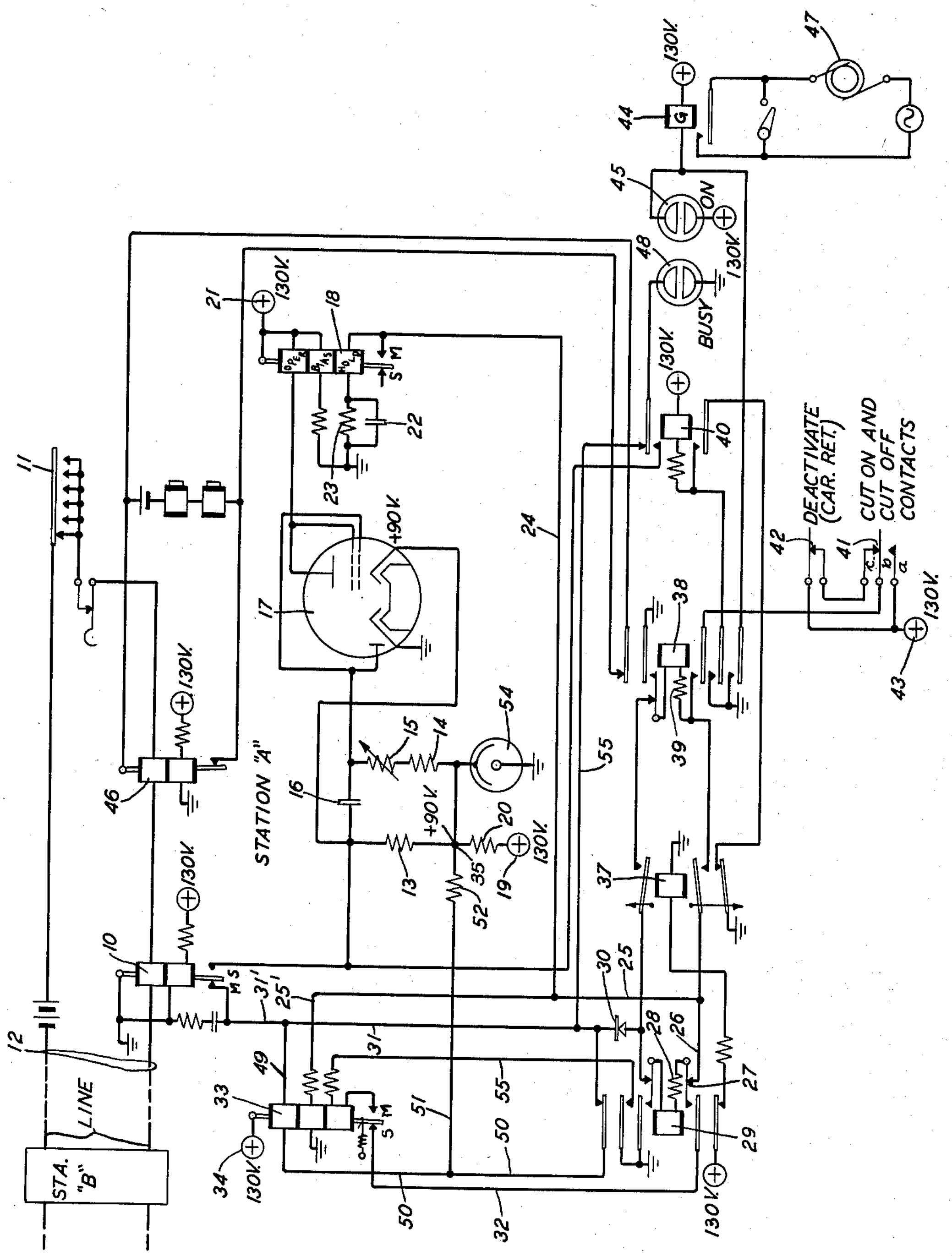
INVENTOR
H. J. BRITT
BY
R. C. Terry
ATTORNEY

United States Patent Office 2,739,180

Patented Mar. 20, 1956

2,739,180

MESSAGE ADDRESS INTERCOMMUNICATING TELEGRAPH SYSTEM

Horace J. Britt, Alexandria, Va., assignor to American Telephone and Telegraph Company, a corporation of New York Application October 21, 1952, Serial No. 316,033

7 Claims. (Cl. 178—4.1)

This invention relates to a selective calling system and particularly to such a system in which a plurality of stations arranged to be selectively called, are associated with a common signaling channel.

An object of the invention is to utilize teletypewriter code signals in transmitting station-calling signals and telegraph message signals over the same communication channel.

Another object of the invention is to render the selective station-calling receiving apparatus unresponsive to telegraph message signals.

In accordance with the preferred embodiment of the invention the system includes a plurality of stations each having identical equipment. Each station is arranged to select for communication purposes by the message address method wherein teletypewriter character signals are employed, one or more of the other stations. A principal feature is the provision of a timing circuit which is designed to operate only in response to a "blank" signal of the five unit teletypewriter code, and in response to two successive "blank" signals, a system of relays responsive to the successive operations of the timing circuit is effective to start the teletypewriter motors at all stations in the system. Following the two successive "blank" signals are transmitted three "letters" signals which serve to permit the motors to attain the desired speed, particularly when remote motor control is used. A "figures" signal and a single character cut-on signal for each of the stations, including the calling station, desired in the connection, are then transmitted as message address codes, each cut-on signal serving to lock in a closed position the cut-on contact of the teletypewriter at a selected station. After transmittal of all the "cut-on" codes from the calling station, the "carriage return," or "deactivate," signal followed by the "line feed" and "letters" signals are transmitted to properly position the teletypewriter carriage at each of the selected stations and to automatically deactivate the teletypewriters at all unselected stations. The teletypewriters at the selected stations are now in condition to receive the message. Following the transmission of the message the "figures," "H" and "blank" signals followed by a "letters" signal are transmitted to stop the teletypewriter motors at all the selected stations and place the system in condition for the next connection. Therefore, in the proposed arrangement any station in the system may originate a call to one or more of the other stations by transmitting the required teletypewriter code signals, the timing circuit being adapted to respond to the six-unit code as well as to the five-unit code by suitable adjustment of the impedance value of the timing circuit.

A feature of the invention is the provision of means which permits a faster action in establishing a connection whereby a greater number of stations may be selected in a given interval of time, the transmittal of one character signal only being required to select a station.

Another feature is the provision of means which reduces the chance of error in selecting a station inasmuch as only one directing code signal is required to select a station and the characters for these directing code signals are printed at the calling station teletypewriter thereby giving the calling attendant a record of the stations selected.

Another feature is the provision of a teletypewriter keyboard or automatic transmitter at each station for selecting the desired station thus obviating the need for special calling equipment.

Another feature is the practicability of using an automatic transmitter-distributor or a reperforator-transmitter since the use of machines of these types permit an attendant to perforate and store in a tape all the information necessary to direct messages to the proper destination. This feature resides in the means responsive to signals generated by the teletypewriter keyboard, or the automatic transmitter-distributor or reperforator-transmitter, for effecting activation, selection and deactivation of one or more teletypewriters connected to the line circuit.

Another feature is the provision of means for furnishing a positive busy indication at all stations when the circuit is busy.

Another feature is the provision of means responsive to two consecutive "blank" signals to activate all the teletypewriters connected to the line circuits for receiving message address, or directing, code signals.

Another feature is the provision of means responsive to the "carriage return" signal to automatically deactivate all non-selected, or unwanted, teletypewriters connected to the line circuit.

Another feature is the provision of two supervisory lamps, namely an "on" and a "busy" lamp at each teletypewriter station connected to the line circuit. The "on" lamp is lighted only when the teletypewriter is activated to receive messages. During the time when the line circuit is busy the "busy" lamp flashes on teletypewriter signals but remains lighted on a closed circuit. The flashing of the lamp furnishes an indication that the line circuit is actually being used during the busy condition and the steady lighted condition of the lamp indicates when the line circuit is inadvertently left in the busy condition. The lighted "busy" lamp on an idle closed line circuit guards against an attendant attempting to seize the line circuit during a pause in transmission. A lighted "on" lamp and a prolonged extinguished "busy" lamp would indicate an open line circuit. The "busy" lamp is also connected during a non-busy condition on the line circuit, in which case the "busy" lamp lights on the opened line circuit and is extinguished on a closed line circuit. The "busy" lamp will flash on "hits" or telegraph signals received on the line circuit. A prolonged lighted "busy" lamp with its "on" lamp extinguished indicates an open line circuit. Seizure of the line circuit by an attendant is immediately indicated at all stations by the busy lamp flashing on the activate signal.

Another feature is the provision of means for remote motor control. Remote motor control may be used at some stations on the line circuit and not at others, if so desired.

Another feature is the provision of means for affording privacy in that no unselected station can monitor on a busy line circuit without "breaking-in" on such circuits and transmitting the activate code signals followed by the address code signals for such calling station. However, if a customer does not wish the privacy arrangement a monitoring switch may be provided to permit any station to monitor as desired.

A single figure in schematic form shows the preferred arrangement of a telegraph station in an intercommunicating teletypewriter system.

In order to initiate a call an attendant transmits from a teletypewriter keyboard at any station on the line circuit three signals, namely "blank," "blank" and "letters" in a system wherein no remote motor control is provided or five signals, namely, "blank," "blank," "letters," "letters" and "letters" in a system wherein remote motor control is provided. These signals activate all the teletypewriters on the line circuit including that of the calling station and lights the "on" and "busy" lamps at all stations. He then transmits "figures" signal followed by the address, or directing, code signal for his own station and the address code signal for each of the other stations desired to be included in the connection. The directing code signals operate switching contacts on the respective teletypewriters at the calling and the called stations. The characters for these directing code signals are printed by the teletypewriters at all the stations connected to the line circuit. He then transmits a "carriage return," a "line feed" and a "letters" signal as would be done to position the carriage properly, and proceeds to transmit the message. The "carriage return" signal automatically deactivates the teletypewriters at all unselected stations and extinguishes the "on" lamp at such stations. In a teletypewriter system using the five-unit start-stop code signals the above-mentioned signals have their respective selecting pulses arranged as follows: "blank"—five spacing elements; "letters"—five marking elements; "figures"—mark, mark, space, mark and mark; "carriage return"—space, space, space, mark and space; "line feed"—space, mark, space, space and space; and "H"—space, space, mark, space and mark.

In order to terminate a call the attendant at the calling station transmits a "figures," "H," "blank" and "letters" signal in the order mentioned. The "figures H" signal combination deactivates the teletypewriters at the selected stations and extinguishes the "on" lamps at these stations. The "blank" signal extinguishes the "busy" lamps at all stations. The "letters" signal restores the "blank" teletypewriter activate and deactivate units at all stations to normal idle condition.

With remote motor control the motor is started whenever the teletypewriter is activated and stops when the teletypewriter is deactivated.

The "blank" teletypewriter activate and deactivate unit is essentially a device which samples all teletypewriter signals received over a line circuit and functions on two consecutive "blank" signals to activate the unit to receive messages on the teletypewriter and to start the teletypewriter motor if remote control is provided. By the use of switching contacts on the teletypewriter, means is provided by the receipt of upper case character signals to keep the teletypewriter activated for the receipt of messages or to deactivate it, if desired. In the present invention when the teletypewriter is maintained activated to receive messages means is provided to deactivate the teletypewriter at the end of transmission in response to upper case character signals, the deactivation including the stopping of the motor when the remote motor control feature is used.

In the schematic circuit shown in the drawing, line relay 10 follows the signals transmitted from teletypewriter transmitting contacts 11 at the local station A or received over line circuit 12 from the transmitting contacts at the teletypewriter at a remote station. The signals repeated by relay 10 are transmitted into a timing circuit which comprises resistors 13, 20, 14 and 15, condenser 16, rectifier-amplifier tube 17 and relay 18. Resistors 13, 20, 14 and 15 have resistance values, say of 5,000, 1,000, 275,000 and 100,000 ohms, respectively, and resistor 15 which is of the variable type, is a high stability resistor with a low temperature coefficient. Condenser 16 is preferably of the mineral oil type.

Normally a positive potential of about 90 volts with respect to ground is present at the left-hand plate of condenser 16 but the potential at the right-hand plate is approximately zero. This is because of the comparatively small voltage drop between the anode, to which the right-hand plate of condenser 16 is connected, and the cathode of the left-hand section, or diode of tube 17. Normally no plate current flows through the right-hand section, or triode, of tube 17 wherein the screen grid is connected to its associated tube plate, and the uppermost winding of relay 18, because the cathode of the triode connected through resistor 13 is at this time at a positive potential of about 90 volts with respect to its associated grid which is at about zero potential because it is connected to the anode of the diode. Therefore, at this time the biasing current in the middle winding of relay 18 normally maintains relay 18 in the left-hand, or spacing, position.

In response to a spacing impulse at the beginning of a signal, relay 10 operates to its spacing, or right-hand position to connect ground to the left-hand plate of condenser 16 which instantly causes the right-hand plate of condenser 16 and the anode of the left-hand section of tube 17 to change to a negative potential of about 90 volts. At the same instant, relay 10 upon operating to its spacing position, connects ground to the cathode of the right-hand section of tube 17. Since the cathode of the right-hand section of tube 17 is still highly positive with respect to its associated grid, relay 18 remains in its spacing, or left-hand position. However, at this time condenser 16 begins to charge comparatively slowly from a negative potential of 90 volts toward a positive potential of 90 volts, the path extending from connection point 35 of positive potential of about 90 volts, resistors 14 and 15, condenser 16, spacing contact and armature of relay 10, to ground. The high negative potential on the grid of the right-hand section of tube 17 is therefore gradually decreased in accordance with the duration of the spacing impulse.

The biasing circuit including the middle winding of relay 18, is so adjusted that the relay will operate to its marking position when the control grid of the right-hand section of tube 17 attains a negative potential of about 5 volts. Adjustment of resistor 15 and the capacitance value of condenser 16 determine the duration of a spacing impulse required to operate relay 18. For 60 speed transmission, resistor 15 and condenser 16 are of such values that on a "blank" signal, relay 18 will operate after a duration of 121 milliseconds which is at the middle of the fifth selecting impulse of the signal. This operation at the middle of the fifth selecting impulse allows maximum tolerance against signal distortion. No teletypewriter code signal other than a "blank" signal contains a continuous spacing as long as 121 milliseconds, and therefore relay 18 operates only on such a teletypewriter code signal.

Relay 18 upon operating to its right-hand position, closes a path extending from source 21 of a positive potential of 130 volts, armature, marking contact and lowermost winding of relay 18, condenser 22 and resistor 23, in parallel, to ground, to cause a surge of marking current through the lowermost winding of relay 18. This surge holds relay 18 in its right-hand position for about 60 milliseconds regardless of whether or not plate current continues to flow through the uppermost winding of relay 18. Condenser 22 and resistor 23 are so designed as to provide the proper holding time for relay 18. Also, resistor 23 helps to discharge condenser 22 when relay 18 returns to its left-hand position. The necessity of this holding time to permit the operation of relay 18 for a sufficient duration will be hereinafter described. While relay 18 is in its marking position, potential source 21 is connected to another path extending over conductors 24, 25 and 26, lower make-before-break contact 27, resistor 28, winding and upper make-before-break contact of relay 29, varistor-rectifier 30, conductor 31, to the marking contact of relay 10. For a "blank" signal incoming over line 12 the beginning of the stop impulse occurs 11 milliseconds after relay 18 operates to its marking position. Therefore, 11 milliseconds after relay 18 operates to marking and while relay 18 is still in its marking position under the influence of the current flowing in its lowermost winding, relay 10 returns to its marking position under the influence of and at the beginning of the stop, or marking, impulse of the incoming "blank" signal. Relay 10 upon operating to its marking position, completes the path hereinbefore traced through the winding of relay 29 and relay 29 operates. The ground at the armature and marking contact of relay 10 is applied to the operating circuit of relay 29 for the duration of the stop impulse which duration is for 31 milliseconds, and the duration of the holding effect of the condenser 22 and resistor 23 on the marking position of relay 18. During the interval of time wherein the stop impulse is being received by relay 10 and relay 18 is being held in its marking position, relay 29 operates and then locks up in a path extending from ground, over the front contact and inner lower armature of the relay, conductor 32, spacing, or left-hand, contact and armature of relay 33 to source 34 of positive potential of 130 volts. Subsequent operations caused by relay 29 locking in its operated position will be hereinafter described.

At this point it can be seen that the holding time of relay 18 is necessary to condition relay 29 to operate under control of relay 10 during the time interval that the stop impulse of the "blank" signal should be received. If this holding time were not provided, relay 18 would be operated to spacing at the beginning of the stop impulse; thus, relay 29 would not be conditioned to operate under the control of relay 10 during the stop impulse of the "blank" signal. On the other hand, if the holding time on relay 18 were made longer than the time necessary to secure operation of relay 29 during the stop impulse, the susceptibility of relay 29 operating on open signals other than a "blank" signal, for example, open signals caused by "line hits" or "break" signals, would be increased. This holding time is not critical but it should not be made longer than necessary for the reasons mentioned.

When relay 10 operates to marking at the beginning of the stop impulse the left-hand plate of condenser 16 is changed instantly by 90 volts in a positive direction. This instantly tries to change the potential of the right-hand plate of condenser 16 by a like amount in the same direction. However, as soon as the potential on the right-hand plate becomes slightly positive, the potential on the plate of the left-hand section of tube 17 becomes positive and this section of tube 17 functions essentially to connect the right-hand plate of condenser 16 to ground at the cathode of such section. Condenser 16 then starts to store a charge in a path extending from source 19, resistor 20 having a resistance, say of 1,000 ohms, resistor 13, condenser 16 and the relatively low resistance path between the plate and cathode of the left-hand section of tube 17, to ground. The resistance 13 is made low enough in resistance value to permit condenser 16 to store a charge up to 90 volts during the shortest expected duration of the stop impulse. It should be noted at this point that for any spacing signal, the grid of the right-hand section of tube 17 can never become more than slightly positive because of the low resistance path to ground through the left-hand section of the tube.

When relay 29 operates, it disconnects its winding from the marking contact of relays 10 and 18 and locks up through the path extending over the spacing contact and armature of relay 33, to source 34. Also, relay 29, upon operating, effects the release of relay 37 which is normally operated. Relay 37 upon releasing, connects the marking contacts of relays 10 and 18 to the winding of relay 38, thus conditioning relay 38 to operate and respond to a subsequent "blank" signal in the same manner as relay 29 operated in response to the first "blank" signal, the circuit for operating relay 38 being traceable from the marking contact of relay 18, conductors 24 and 25, inner lower armature and back contact of relay 37, resistor 39, through the winding and upper make-before-break contact of relay 38, back contact and upper armature of relay 37, varistor-rectifier 30, conductor 31, to the marking contact of relay 10. In addition, relay 29 upon operating, removes at its outermost upper armature and back contact the shunt path extending through the uppermost winding of relay 33 thereby conditioning relay 33 to operate and lock up on the next marking selecting impulse of an incoming signal. The operating path for relay 33 is traceable from ground at the armature and marking contact of relay 10, conductors 31 and 49, through the uppermost winding of relay 33, conductors 50 and 51, resistor 52 having a resistance, say of 5,000 ohms, resistor 20, to grounded source 19 of positive potential, and the locking path is traceable from source 34, armature, marking contact and lowermost winding of relay 33, conductor 55, front contact and middle upper armature of relay 29, to ground.

Relay 37 upon releasing opens at its outer lower armature and front contact the locking circuit for relay 40, the function of which will be hereinafter described. The release time of relay 37 is not at all critical. The purpose of relay 37 is to insure that relay 38 is not exposed to operation from the same "blank" signal that operates relay 29; on the other hand, relay 37 must release fast enough to condition relay 38 to operate on the immediately following "blank" signal. These requirements are satisfied if the release time of relay 37 is between about 49 and 141 milliseconds.

If the next immediately following incoming teletypewriter signal is a "blank" signal, relay 38 will operate and close a locking circuit for itself extending from ground at the inner upper armature and front contact, through the winding of relay 38, resistor 39, front contact and innermost lower armature of relay 38, normally closed "cut-on and cut-off" contact 41, normally closed "deactivate" contact 42, to source 43 of positive potential of 130 volts, contacts 41 and 42 being located on the teletypewriter and responsive to the address character signal assigned to that particular teletypewriter and the "carriage return" signal, respectively. Relay 38, upon operating, also performs the following functions: (1) At its outermost lower armature and front contact closes a circuit for operating relay 44 and lighting "on" lamp 45; (2) removes at its outer upper armature and back contact a shunt path across the armature and contact of receiving relay 46 whereby the receiving mechanism of the teletypewriter becomes activated; and (3) closes at its middle lower armature and front contact an operating circuit for relay 40. Relay 44 operates and thereby closes an operating circuit for teletypewriter motor 47. Lamp 45 upon lighting, furnishes a visual indication that the teletypewriter is activated. Relay 40 operates and closes at its upper armature and front contact an energizing circuit for "busy" lamp 48 which will light to give a visual indication that the line circuit is busy, the lamp remaining lighted on an idle marking condition but will flash in response to signals incoming over the line circuit. Lamps 45 and 48 are of the neon phototube type.

If the next incoming signal immediately following the first "blank" signal is not a "blank" signal, one of the selecting pulses of such next signal will be marking. The first marking selecting pulse will cause marking current to flow through the uppermost winding of relay 33 in a circuit hereinbefore traced. Relay 33 operates and then locks up momentarily in a circuit also hereinbefore traced. Relay 33 upon operating from its spacing to its marking position opens locking circuit for relay 29 which now releases. Relay 29 upon releasing performs the following functions: (1) opens at its middle upper armature and front contact the locking path for relay 33 thereby returning relay 33 to its normally released condition; (2) closes at its outermost upper armature and back contact the shunt path around the uppermost winding of relay 33 thereby preventing any teletypewriter signals from operating relay 33; (3) reconnects at its upper and lower make-before-break contacts, the circuit interconnecting the marking contacts of relays 10 and 18, thereby conditioning itself to receive any subsequent "blank" signals and (4) closes at its outer lower armature and back contact the circuit for maintaining relay 37 normally operated. Relay 37 operates to disconnect the winding of relay 38 from the marking contacts of relays 10 and 18 thus preventing relay 38 from operating on an initial "blank" signal.

It is well at this point to explain the purpose of the middle winding of relay 33. On receipt of the initial "blank" signal, relay 29 operates during the "stop" pulse and thereby allows current to flow in a marking direction through the uppermost winding of relay 33. The operation of relay 33 is not desired at this time, however, since if it were to operate it would open the locking path of relay 29. Relay 33 is prevented from operating by having relay 18 in its marking position whereby a circuit is closed traceable from positive potential source 21, armature and marking contact of relay 18, conductors 24 and 25', through the middle winding of relay 33, to ground. The current in the circuit flows through the middle winding in a spacing direction thereby canceling the effect of the marking current in the uppermost winding. This canceling current is removed shortly after the end of the "stop" pulse so that relay 33 can operate on any marking selecting pulse.

Following the activation of the teletypewriter by the operation of relay 38 in response to the second consecutive "blank" signal, the calling station transmits one or three "letters" signals depending upon whether or not remote motor control is used, the three "letters" signals being required when remote motor control is used. Immediately following the "letters" signals the "figures" signal and a single character code cut-on signal for each station desired to be included in the connection are received. The first selecting pulse of the "figures" signal is marking and as hereinbefore stated this marking pulse operates relays 10 and 33 to their respective marking positions. Relay 33 in its marking position opens the locking circuit for relay 29 which now releases. In response to the cut-on signal the cut-on contact 41 on the teletypewriter at the selected station to which the cut-on signal is assigned, mechanically operates to and locks in its alternate position. At those stations not desired to be included in the connection the cut-on contacts at their respective teletypewriters remain unoperated, that is, in their normal positions. After the transmittal of all cut-on code signals by the calling station the deactivate code signal, that is, the "carriage return" signal is transmitted and in response to this signal the deactivate contact 42 on the teletypewriters at all the stations are momentarily opened.

On the teletypewriters at those stations which are not selected for connection to receive the message, the cut-on code contacts corresponding to contact 41 are not operated, and the momentary opening of the deactivate contacts corresponding to contact 42 opens the locking path of the relays corresponding to relay 38 whereby these relays at those stations not selected are released. Each of the relays corresponding to relay 38, at the unwanted stations, upon releasing, performs the following functions: (1) Deactivates the receiving mechanism of the associated teletypewriter thus preventing it from receiving the message; (2) releases the relay corresponding to relay 44 to stop the teletypewriter motor if the remote motor control operation is used; and (3) extinguishes the "on" lamp correspond to lamp 45 to indicate that the teletypewriter is deactivated. The busy lamp corresponding to lamp 48 continues to light on a marking current circuit condition because the relay corresponding to relay 40 at station A is locked operated under control of its associated normally operated relay corresponding to relay 37. Thus a positive visual busy indication is provided at all stations regardless of whether or not the teletypewriters are activated.

On the teletypewriters at all the selected stations having the cut-on contacts 41 operated to their respective alternate positions, the momentary opening of the deactivate contacts corresponding to contact 42, has no effect since the cut-on contacts in their operated position short-circuit their respectively associated deactivate contacts. Thus the teletypewriters at the selected stations remain activated to receive the message.

At the conclusion of transmission of the message the calling station preferably transmits "figures H," "blank" and "letters" signals.

At all activated teletypewriters the receipt of "figures" and "H" signals locks open the cut-on contacts corresponding to contact 41 and thereby momentarily opens the locking circuit of the relays corresponding to relay 38. The relay corresponding to relay 38, at each of the stations whereat the teletypewriters are in activated condition releases to perform the following functions: (1) Deactivates the receiving mechanism of its station teletypewriter thus preventing it from receiving messages; (2) releases its associated relay corresponding to relay 44, to stop the teletypewriter motor if the remote motor control is used; (3) extinguishes its associated "on" lamp corresponding to lamp 45 to indicate the teletypewriter is deactivated; and (4) conditions its associated relay corresponding to relay 40 to release under control of another of its associated relays, corresponding to relay 37, the locking circuit for a relay 40 still being closed at this time. In response to the "blank" signal the relays corresponding to relay 29, at all stations operate and lock up thereby releasing their respectively associated relays corresponding to relay 37. The release of the relay corresponding to relay 37 releases its associated relay corresponding to relay 40 whereby the busy lamp corresponding to lamp 48 is conditioned to light on only spacing signals transmitted from any of the teletypewriters at all stations, the circuit at station A being traceable from source 19 of positive potential, resistors 20 and 52, conductor 51, through the uppermost winding of relay 33, conductors 49, 31 and 53, back contact and upper armature of the relay 40, through the busy lamp 48, to ground. In response to the "letters" signal the relay corresponding to relay 33 operates to its right-hand position thereby releasing its associated relay corresponding to relay 29, at all stations. This restores the station to the normal idle circuit condition.

It should be noted that under an idle circuit condition with all teletypewriters deactivated, the busy lamps will light on an open circuit condition and will flicker on any signals transmitted over the circuit. This will serve to furnish an indication that a continuing open circuit condition exists; also it will guard against two stations trying to initiate a call at the same time. It should also be noted that during a busy line circuit condition, the busy lamp flickers on teletypewriter signals but remains lighted on an idle marking current circuit condition. This flickering condition is desirable so that a continuing lighted busy lamp condition can be investigated as the circuit in a busy condition may have been left open inadvertently. The lighted busy lamp on an idle marking current condition is desirable to guard against a deactivated station attempting to seize the line circuit during the time that a station transmitting by keyboard, may be pausing.

Tube 54 is a cold-cathode tube and serves as a voltage regulator to overcome voltage variations in the timing circuit. The timing circuit is sensitive to such variations and a variation of a few volts has an appreciable effect on the distortion tolerance of the circuit. For appreciable variations in supply voltage, tube 54 should hold the voltage variations to within about one volt. It is generally known that the phototube, such as tube 54, functions best if its load is kept as constant as practicable. To accomplish this, resistor 52 is connected in the circuit as shown, to place the same load on tube 54 during the marking current condition as exists during the spacing current condition. It will be noted from the drawing that when this is done, particularly at times when relay 10 is in its spacing position a positive potential of about 90 volts would ordinarily be applied to a circuit extending from source 19, resistors 20 and 52, conductor 51, outermost upper armature and back contact, upper make-before-break contact and winding of relay 29, resistor 28, lower make-before-break contact 27, conductors 26, 25 and 24, through the lowermost winding of relay 18, resistor 23, to ground. The direction of the current resulting in the circuit just traced would be undesirable and in order to prevent the flow of current in such a direction varistor-rectifier 30 is connected in the circuit in the manner shown in the drawing.

What is claimed is:

1. In a telegraph system, a transmission channel and a plurality of stations connected thereto, each station comprising a line relay operably associated with said channel and responsive to signals transmitted over said channel, a teletypewriter for sending and receiving messages over said channel, a timing circuit controllable by said line relay and responsive to a "blank" telegraph signal only received by said line relay over said channel from one of said teletypewriters, and a space discharge device responsive to the operation of said timing circuit and diode means for controlling the duration of the effective response of said space discharge device to said timing circuit, relaying means arranged to operate in response to the effective operation of said space discharge device, and having other means for maintaining itself in an operated condition after said space discharge device restores to normal, other relaying means arranged to be prepared for operation in response to the operation of the first-mentioned relaying means, and means included in said line relay and responsive to the "stop" pulse of the "blank" signal effective to operate said other relaying means, still another relaying means arranged to be conditioned for operation in response to the operation and subsequent release of said other relay means, and motor driven means controlled by said still other relaying means and operative in response to the second of two "blank" signals successively transmitted from said one teletypewriter for activating its associated teletypewriter.

2. In a telegraph system, a transmission channel and a plurality of stations connected thereto, each station comprising a line relay operably associated with said channel and responsive to signals transmitted over said channel, a teletypewriter for sending and receiving messages over said channel, a timing circuit controllable by said line relay and responsive to a "blank" teletypewriter signal only received by said line relay over said channel from one of said teletypewriters, and a space discharge device having diode and triode sections, said triode section arranged to conduct in response to the operation of said timing circuit and said diode section controlled by said timing circuit and arranged to control the effective conductivity of said triode section, an electromagnetic means arranged to operate in response to the conductivity of said triode section and a delay circuit controlled thereby for maintaining said electromagnetic means in operated condition for an interval of short duration after said triode section ceases to conduct, other electromagnetic means arranged to be prepared for operation in response to the operation of the first-mentioned electromagnetic means, and means controlled by said line relay in response to the "stop" pulse of said "blank" signal for completing the operation of said other electromagnetic means, still other electromagnetic means arranged to be conditioned for operation in response to the operation and subsequent release of said other electromagnetic means, motor driven means controlled by said still other electromagnetic means and operative in response to the second of two "blank" signals successively transmitted from said one teletypewriter for activating its associated teletypewriter simultaneously with the teletypewriter at each of the other stations in a receiving condition, a receiving relay at each station additional to said line relay and adapted, upon removal of a shunt across its contacts, to repeat signals from said channel to said teletypewriter, and means forming a part of said still other electromagnetic means for removing said shunt.

3. In a telegraph system, in accordance with claim 2, wherein the teletypewriter at each of said stations includes mechanically operated means arranged to be responsive to a distinctive teletypewriter signal transmitted from said one teletypewriter for locking in operated condition the motor driven means for the teletypewriter whereby the motor driven means for two or more teletypewriters may be locked in operated condition successively through the selectively operated mechanically operated means of said two or more teletypewriters in response to the distinctive teletypewriter signals respectively assigned thereto, means controlled by said mechanically operated means for conditioning said two or more teletypewriters for simultaneously receiving a message transmitted from said one teletypewriter, other mechanically operated means responsive to other teletypewriter signals from said one teletypewriter for deactivating teletypewriters in unlocked operated condition at the others of said stations, and means arranged to be responsive to still other teletypewriter signals for deactivating all of said teletypewriters locked in operated condition and restoring said system to normal.

4. In a station selector system, a signal transmission channel, a relay operably associated with said channel and responsive to signals transmitted over said channel, an electron discharge tube having an anode, a cathode and a grid electrode, a condenser having one terminal thereof connected to the cathode of said tube and having the other terminal thereof connected to said grid electrode, potential difference means for normally impressing on said condenser a charge making said cathode positive with respect to said grid, diode discharge devices having connection with said potential difference means for stabilizing and determining the magnitude of potentials applied to the two terminals of said condenser relative to a common reference potential, a path between said relay and said condenser and controllable by said relay for initiating controlled discharging of said condenser to effect in the case of a critically timed signal a discharge through said tube, and means for cumulatively registering successive operations of said tube in response to repeated identical signals and for effecting a selective operation in accordance therewith.

5. In a station selector system, a signal transmission channel, a receiving relay operably associated with said channel and responsive to signals transmitted over said channel, an electron discharge device, a time constant network controllable by said receiving relay for operating said electron discharge device, potential difference means for impressing on a portion of said time constant network a potential difference, diode discharge devices having connection with said potential difference means for stabilizing and determining the magnitude of potentials applied to said portion of said time constant network, a second relay having an operating winding energizable by discharge of said electron discharge device, and a counting relay chain for cumulatively registering actuations of said second relay by successive operations of said electron discharge device in response to repeated identical signals and for effecting activation of station apparatus.

6. In a selective station calling system, means for transmitting permutation code signal combinations, a signal responsive relay adapted to respond to transmitted signal combinations, an electron discharge tube, means interposed between said relay and said tube for causing said tube to draw current upon response of said relay to a particular one only of the signal combinations of said code, a second relay operable upon current drawn by said tube, a chain of relays for counting the operations of said second relay, station activating means operable by said counting relay chain upon counting a predetermined number of operations of said second relay, means for causing said second relay to remain operated for a predetermined interval, a third relay operably associated with said signal responsive relay for restoring said chain to normal from the first operative step thereof, and means for precluding operation of said third relay while said second relay remains operated.

7. In a selective station calling system, means for transmitting permutation code signal combinations, a signal responsive relay adapted to respond to transmitted signal combinations, an electron discharge tube, means interposed between said relay and said tube for causing said tube to draw current upon response of said relay to a particular one only of the signal combinations of said code, a second relay operable upon current drawn by said tube, a chain of relays for counting operations of said second relay, station activating means operable by said counting relay chain upon counting a predetermined number of operations of said second relay, means for causing said second relay to remain operated for a predetermined interval, a third relay connected so as to tend to be operated by said signal responsive relay upon response thereof to a signaling condition invariably following each signal combination, and means for precluding operation of said third relay by said signal responsive relay while said second relay remains operated.

References Cited in the file of this patent

UNITED STATES PATENTS

| | | |
|---|---|---|
| 1,867,209 | Chauveau | July 12, 1932 |
| 1,955,874 | Demarest | Apr. 24, 1934 |
| 2,094,733 | Byrnes | Oct. 5, 1938 |
| 2,148,430 | Benjamin | Feb. 28, 1939 |
| 2,152,010 | Zenner | Mar. 28, 1939 |
| 2,320,997 | Bacon | June 8, 1943 |
| 2,332,645 | Keithley | Oct. 26, 1943 |
| 2,334,574 | Neiswinter | Nov. 16, 1943 |
| 2,455,724 | Bacon | Dec. 7, 1948 |
| 2,477,309 | Maxwell | July 26, 1949 |
| 2,552,174 | Holloway | May 8, 1951 |
| 2,569,980 | Eggensperger | Oct. 2, 1951 |
| 2,659,879 | Papenfus | Nov. 17, 1953 |